(12) United States Patent
Tredoux et al.

(10) Patent No.: US 9,191,213 B2
(45) Date of Patent: Nov. 17, 2015

(54) METHODS AND SYSTEMS FOR MESSAGING WITH PHYSICAL PRESENCE AND TEMPORAL VERIFICATIONS

(71) Applicant: XEROX CORPORATION, Norwalk, CT (US)

(72) Inventors: Gavan Tredoux, Penfield, NY (US); Saurabh Prabhat, Webster, NY (US); Kanishk Jain, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/132,687

(22) Filed: Dec. 18, 2013

(65) Prior Publication Data

US 2015/0172059 A1    Jun. 18, 2015

(51) Int. Cl.
*H04L 9/32*    (2006.01)
(52) U.S. Cl.
CPC .................................. *H04L 9/3247* (2013.01)
(58) Field of Classification Search
CPC ..... H04L 9/3247; H04L 9/321; H04L 9/3213; H04L 9/3297; H04L 9/3234; H04L 63/0492; G09F 3/00; G06Q 20/341
See application file for complete search history.

(56) References Cited

U.S. PATENT DOCUMENTS

| | | | |
|---|---|---|---|
| 2001/0056411 A1* | 12/2001 | Lindskog et al. | 705/76 |
| 2006/0010086 A1* | 1/2006 | Klein | 705/410 |
| 2007/0054616 A1* | 3/2007 | Culbert | 455/41.1 |
| 2008/0069347 A1* | 3/2008 | Brown et al. | 380/45 |
| 2011/0258443 A1* | 10/2011 | Barry | 713/168 |
| 2012/0300937 A1* | 11/2012 | Burbridge et al. | 380/278 |
| 2014/0019759 A1* | 1/2014 | Burmester et al. | 713/172 |
| 2014/0073300 A1* | 3/2014 | Leeder et al. | 455/416 |
| 2014/0081860 A1* | 3/2014 | Adrangi et al. | 705/44 |
| 2014/0286491 A1* | 9/2014 | Atherton | 380/270 |
| 2014/0357187 A1* | 12/2014 | Ehrensvard | 455/41.1 |

OTHER PUBLICATIONS

Roy Want "An Introduction to RFID technology", published by IEEE CS and IEEE ComSoc, 2006, 9 pages.*
Tredoux et al., U.S. Appl. No. 13/852,238, filed Mar. 28, 2013, entitled "System and Method for Location Assurance Using Passive Computational Tags."

* cited by examiner

*Primary Examiner* — Catherine Thiaw
(74) *Attorney, Agent, or Firm* — MH2 Technology Law Group LLP

(57) ABSTRACT

A system and method for verifying proximity to a computational tag by receiving a first token from a server and transmitting the first token to the computational tag. The computational tag can verify the first token and generate a second token based on the first token where the second token includes a signature of the computational tag. The computational tag can transmit the second token to the mobile device and the mobile device can transmit the second token to the server. The server can verify the second token and allow access to a messaging service based on the verification of the second token.

20 Claims, 5 Drawing Sheets

METHODS AND SYSTEMS FOR MESSAGING WITH PHYSICAL PRESENCE AND TEMPORAL VERIFICATIONS

TECHNICAL FIELD

The present disclosure relates generally to methods, systems, and computer-readable media for electronic messaging with strong physical presence and temporal verifications.

BACKGROUND

Electronic messaging can allow a user to communicate with anyone that has access to the same computer network from any location. Examples of electronic messaging can include one-to-one communication, such as email, text messaging, and instant messaging, and one-to-many communication, such as electronic bulletin board systems, internet forums, websites, blogs, and newsgroups.

Generally, most forms of electronic messaging allow for near complete anonymity between users. While many users may find such anonymity beneficial, it can also make such forms of electronic messaging susceptible to frauds, scams, and other issues.

Accordingly, messaging systems that can provide relative anonymity while still providing proof that a user is at, for example, a particular location within a particular time-window may be desirable.

Therefore, methods and systems for providing messaging services can be improved by providing strong physical presence and temporal verifications.

SUMMARY

The present disclosure relates generally to methods, systems, and computer readable media for providing these and other improvements to messaging services.

In some embodiments, a mobile device can receive a first token from a server, and then transmit the first token to a computational tag. The computational tag can verify the first token and generate a second token based on the first token where the second token includes a signature of the computational tag. The computational tag can transmit the second token to the mobile device and the mobile device can transmit the second token to the server. The server can verify the second token and allow access to a messaging service based on the verification of the second token.

In certain embodiments, the first token can include a signature of the server and the computational tag can verify the first token by verifying the signature of the server. In such embodiments, the signature of the computational tag can be a countersignature of the server's signature.

In further embodiments, the first token can be transmitted to the computational tag using proximity communication. For example, the proximity communication can include at least one of Radio-frequency identification (RFID), a communication using near-field communication (NFC) standard, and a communication using Bluetooth® standard. Additionally, in some embodiments, the computational tag can be powered using the proximity communication.

In some embodiments, the access to the messaging service allowed by the server can include at least one of read access and write access. Additionally, the messaging service can be, for example, at least one of email, text messaging, instant messaging, an electronic bulletin board, an internet forum, a websites, a blog, and a newsgroup.

Further, in certain implementations, the second token can include a timestamp generated by the computational tag, and the verification of the second token can include verifying the signature of the computational tag and verifying that the timestamp is within a specified time window.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
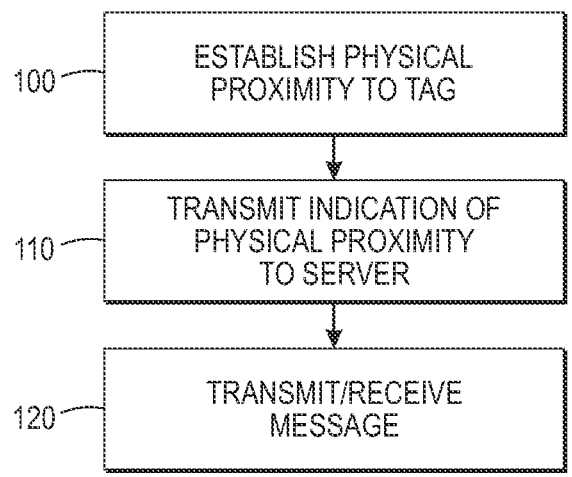
FIG. 1 is a flow diagram illustrating an exemplary method of verifying physical proximity to a tag, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method of verifying physical proximity to a tag, consistent with certain disclosed embodiments. In 100, a mobile device can establish physical proximity to a tag. The mobile device can represent, for example, a device such as a cellular phone (e.g. a smartphone), a tablet computer, or a laptop.

In embodiments, a tag can represent a static computer-readable identifier, such as, for example, a bar-code or a Quick Response Code ("QR Code). In further embodiments, a tag can represent an unpowered chip, such as a radio-frequency identification ("RFID") chip, that uses radio-frequency electronic fields to transfer data. In still further embodiments, a tag can represent a computational tag capable of, for example, signing, countersigning, and/or timestamping tokens. As used herein, a tag can represent any device, chip, or mark capable of communicating data (e.g. an identifier) to a device and/or capable of signing, countersigning, and/or timestamping a token.

In 100, the mobile device can establish physical proximity to the tag using proximity communication methods such as, but not limited to: optically scanning a code, identifier, and/or number; activating an unpowered tag using electronic fields to enable communication and transmission of a code, identifier, and/or number; activating an unpowered computational tag to enable communication, transmission, validation, timestamping, and signing/countersigning of tokens; communicating a code, identifier, and/or number from another powered device; and communicating timestamped and/or signed/countersigned tokens with another powered device.

In 110, the mobile device can transmit an indication of physical proximity to a messaging server. In embodiments, the mobile device can transmit a code, identifier, and/or number, received via the tag, to the messaging server. In further embodiments, the mobile device can transmit a token that was signed, countersigned, and/or timestamped by the tag to the messaging server.

The messaging server can subsequently process the code, identifier, number, and/or token received to verify that the mobile device is located in proximity to the tag. For example, the messaging server can verify whether the correct code, identifier, and/or number was received. In some embodiments, the messaging server can verify the signature/countersignature of the received token and/or the timestamp.

Once the messaging server validates the transmission received from the mobile device, the messaging server can allow the mobile device to request messages associated with the tag and/or submit messages to be associated with the tag. In some embodiments, if multiple messages are associated with the tag, the messaging server can transmit a listing of the multiple messages to the user to allow the user to select which messages to receive.

In further embodiments, the tag can be associated with a particular messaging service and/or particular messages within a messaging service. For example, the tag can be associated with a particular electronic bulletin board and/or a particular thread within the electronic bulletin board.

In alternative embodiments, the messaging server can validate the transmission received from the mobile device, but may not immediately grant read and/or write privileges to the mobile device. For example, in some embodiments, the messaging server may require that the mobile device be in proximity to multiple tags, and, accordingly, may only grant read and/or write privileges once the mobile device has transmitted tokens individually signed by the multiple tags. Further, in other embodiments, the messaging server may require that the mobile device access the tags in a particular order, and may only grant read and/or write privileges once the mobile device has transmitted tokens individually signed and timestamped by the tags where the timestamps indicate that the tags were accessed in the correct order.

In still further embodiments, the messaging server may require that multiple users access the same tag and/or multiple specified tags before granting read and/or write privileges. For example, the messaging server may require that two different users access the same tag before granting read and/or write privileges to either user. As an additional example, the messaging server may require that three different users access any one of two specified tags before granting read and/or write privileges to any user. In some implementations, the messaging server may require that the multiple users be specified users, while, in other implementations, the users may not be specified and any unique users can fulfill the requirement.

In 120, mobile device can transmit new messages to the messaging server and/or receive messages from the messaging server. Examples of messages can include, but are not limited to, email, text messages, instant messages, website postings, forum postings, electronic bulletin board postings, etc. Further, a message can include, for example, textual data, encoded data, image data, video data, audio data, etc. In some embodiments, the received messages can be in response to a request for particular messages. In other embodiments, the received messages can be transmitted automatically from the messaging server upon validation of the transmission in 110.

While the steps depicted in FIG. 1 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 2:
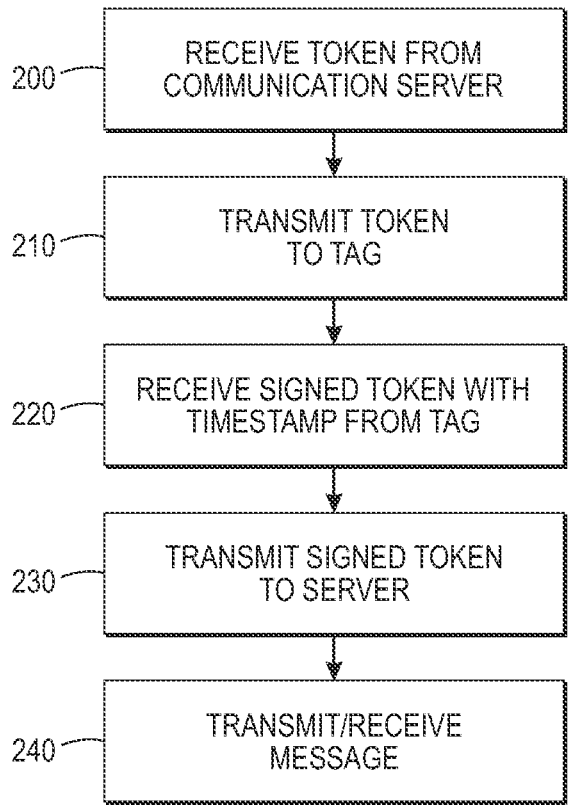
FIG. 2 is a flow diagram illustrating an exemplary method of verifying physical proximity to a computational tag, consistent with certain disclosed embodiments.

FIG. 2 is a flow diagram illustrating an exemplary method of verifying physical proximity to a computational tag, consistent with certain disclosed embodiments. In 200, a mobile device can receive a token from a messaging server. The mobile device can represent, in embodiments, a mobile device, such as a cellular phone (e.g. a smartphone), a tablet computer, or a laptop. Additionally, the token can represent a software security token which can be implemented using, for example, a shared secret architecture or a public-key architecture.

In some embodiments, the mobile device can receive the token in response to a request for the token, a request to receive a message, or a request to create a new message via the messaging server, etc. In further embodiments, the token may be signed by the messaging service before transmission to the mobile device.

In 210, the mobile device can transmit the token to a computational tag. In embodiments, the computational tag can be unpowered and the mobile device can activate the tag using electronic fields (e.g. radio-frequency electronic fields) to enable communication and transmission of the token. In further embodiments, the computational tag can be a powered device.

Upon receipt of the token, the computational tag can sign the token. In some embodiments, the computational tag can additionally timestamp the token. In alternate embodiments, the computational tag can verify the signature of the messaging service and, upon verification, countersign and timestamp the token. If the computational tag is unable to verify the signature of the messaging service, the computational tag may transmit a failure to verify message to the mobile device or may not perform any additional steps until a new token is received.

In 220, the mobile device can receive the signed/countersigned token from the computational tag. The mobile device can then, in 230, transmit the signed/countersigned token to the messaging server.

The messaging server can subsequently process the code to verify the signature/countersignature of the received token. Accordingly, the messaging server can determine whether the user of the mobile device is in proximity to the correct computational tag and/or one of the correct computational tags. Additionally, in embodiments, the messaging server can determine if the user of the mobile device was in proximity to the correct computational tag during a specified time window using the timestamp.

In alternative embodiments, the messaging server can determine which tag signed/countersigned the token based on the signature/countersignature. Accordingly, the messaging server can identify which messaging service and/or message(s) are associated with the tag.

In further embodiments, different computational tags can correspond to different privileges with the messaging server. For example, proximity to certain computational tags can allow a user to create and submit new messages, while proximity to other computational tags may only allow read access to a user. Accordingly, the messaging server can determine which type of access to grant a user based on the signature/countersignature of the computational tag.

Once the messaging server validates the transmission received from the mobile device, the messaging server can allow the mobile device to request messages associated with the tag and/or submit messages to be associated with the tag. In some embodiments, if multiple messages are associated with the tag, the messaging server can transmit a listing of the multiple messages to the user to allow the user to select which messages to receive.

In alternative embodiments, the messaging server can validate the transmission received from the mobile device, but may not immediately grant read and/or write privileges to the mobile device. For example, in some embodiments, the messaging server may require that the mobile device be in proximity to multiple tags, and, accordingly, may only grant read and/or write privileges once the mobile device has transmitted tokens individually signed by the multiple tags. Further, in other embodiments, the messaging server may require that the mobile device access the tags in a particular order, and may only grant read and/or write privileges once the mobile device has transmitted tokens individually signed and timestamped by the tags where the timestamps indicate that the tags were accessed in the correct order.

In 240, the mobile device can transmit and/or receive messages via the messaging server. For example, if the mobile device is determined to have read and write access based on proximity to the computational tag, the mobile device can transmit new messages to the messaging server and receive messages from the messaging server. If the mobile device is determined to only have read access based on proximity to the computational tag, the mobile device can receive messages from the messaging server.

In some embodiments, the received messages can be in response to a request for particular messages. In other embodiments, the received messages can be transmitted automatically from the messaging server upon validation of the transmission in 230.

While the steps depicted in FIG. 2 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 3:
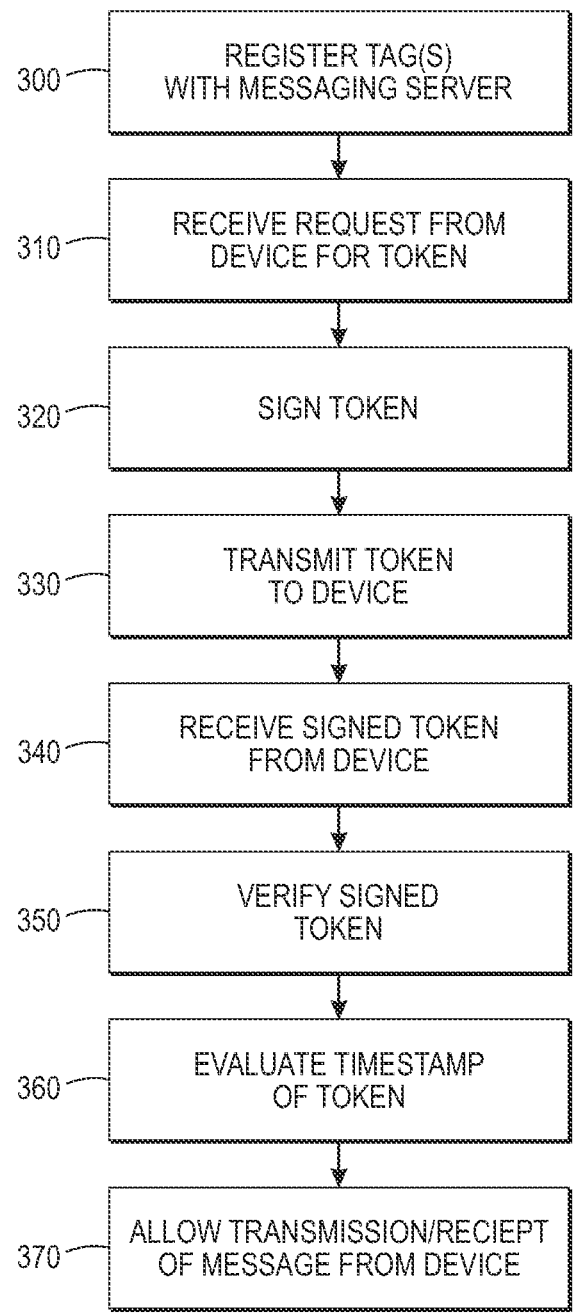
FIG. 3 is a flow diagram illustrating an exemplary method of verifying that a device has physical proximity to a tag, consistent with certain disclosed embodiments.

FIG. 3 is a flow diagram illustrating an exemplary method of verifying that a device has physical proximity to a tag, consistent with certain disclosed embodiments. In 300, a messaging server can register a tag or multiple tags. The messaging server can represent a computing device capable of communicating with one or more mobile devices via a network.

In some embodiments, the messaging server can register the tag(s) in response to a user request. For example, the messaging server may receive a request to register a tag along with a shared secret for the tag. The shared secret can represent any data, such as a password, a number, an array of randomly chosen bits, etc. In some embodiments, the messaging server can generate a shared secret for the tag in response to the request to register the tag, and can transmit the shared secret back to the user, who can program the shared secret into the tag.

As an additional example, the messaging server may receive a request to register a tag along with a public key generated by the tag. In some embodiments, the messaging server may generate a public key/private key pair in response to the request and can transmit the public key generated by the messaging server back to the user, who can program the public key generated by the messaging server into the tag.

In some implementations, the tag(s) can be associated with a particular messaging service (e.g. a particular bulletin board, a particular group of messages, a particular forum, etc.), which can be specified in the request to generate the tag. In further embodiments, the tag(s) can be associated with a particular message, a particular set of messages, messages originating from or addressed to particular users, a particular thread, etc. Additionally, different tags can be associated with different messages and/or different privileges (e.g. read and write access).

In some embodiments, the request can specify that multiple tags must be accessed before read and/or write privileges are given to a device, that a specific sequence of tags must be accessed before read and/or write privileges are given to a device, that a device must access the tag during a given time window to be given access and/or specific privileges, etc.

In 310, the messaging server can receive a request from a mobile device for a token. In some embodiments, the request for a token can be a request to read or write messages via the messaging server. The request can be associated with a particular messaging service, a particular set of messages, a particular message, a particular user, etc.

Based on the request, in 320, the messaging server can generate a token and, in some embodiments, sign the token using, for example, a shared secret or a public key received in 300.

In some implementations, the token can be signed based on which messaging service, particular set of messages, particular message, and/or particular user the request is associated with. For example, the request can be to access a message associated with a particular bulletin board, and a tag may have been registered with the messaging server in 300 and associated with the particular bulletin board. Accordingly, the messaging server can sign the token with a shared secret and/or public key that was received in 300.

In 330, the messaging server can transmit the signed token to the mobile device. The mobile device may then interact with a computational tag, as described above, and the computational tag can countersign and timestamp the token and transmit the countersigned and timestamped token to the mobile device.

In 340, the messaging server can receive the countersigned and timestamped token from the mobile device.

In 350, the messaging server can verify the countersigned token. For example, the computing device can verify the countersigned token using the shared secret and/or the public key received from the tag in 300.

In 360, in some embodiments, the messaging server can evaluate the timestamp of the token. For example, the messaging server can evaluate whether the timestamp is within a time window specified in 300.

In 370, the messaging server can allow transmission and/or receipt of messages from the mobile device based on a verification of the countersigned token. In some embodiments, such an allowance may only occur if the timestamp is within the time window specified in 300 and/or may only allow certain privileges based on the timestamp.

Based on the registration step in 300, the messaging server may only allow transmission and/or receipt of messages if the mobile device sent tokens from multiple specified tags. Additionally, the mobile device may be required to send tokens from multiple specified tags in a particular order/series and/or the timestamp of each token must be in a specified order. Further, the messaging server may only allow certain privileges based on the verification of the token (e.g. read only privileges).

While the steps depicted in FIG. 3 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 4:
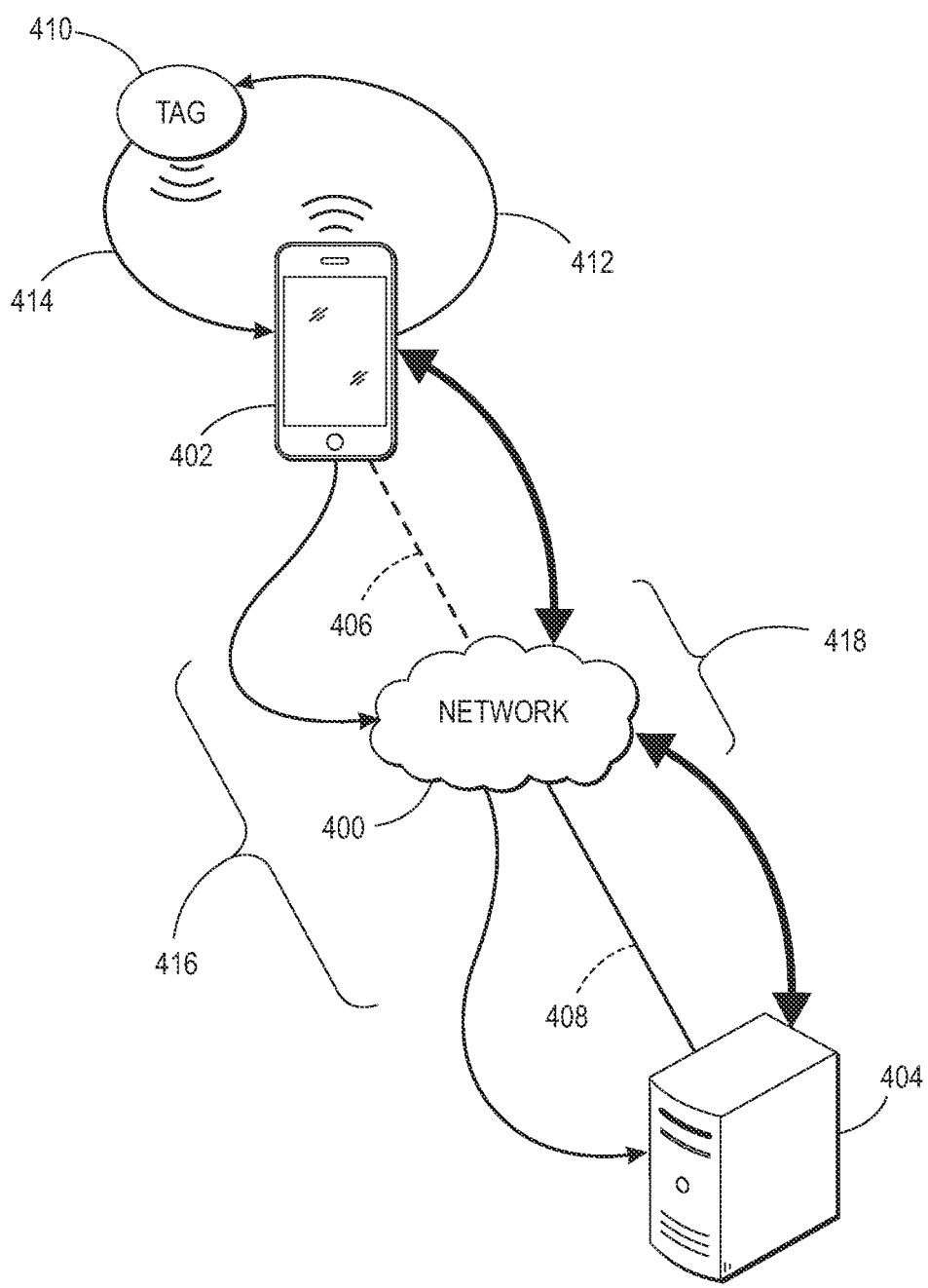
FIG. 4 is a diagram illustrating an exemplary system and process for verifying that a device has physical proximity to a tag, consistent with certain disclosed embodiments.

FIG. 4 is a diagram illustrating an exemplary system and process for verifying that a device has physical proximity to a tag, consistent with certain disclosed embodiments. As depicted in FIG. 4, mobile device 402 can be connected to and communicate with network 400 via, for example, wireless signals 406.

In embodiments, mobile device 402 can represent a device such as a cellular phone (e.g. a smartphone), a tablet computer, a laptop, etc. Further, in some embodiments, network 400 can include one or more networks such as one or more computer networks, one or more cellular networks, a combination of computer networks and cellular networks, etc.

As further depicted in FIG. 4, messaging server 404 can be connected to and communicate with network 400 via, for example, network connection 408. In embodiments, messaging server 404 can include one or more computing devices configured to provide a messaging service.

In the example depicted in FIG. 4, tag 410 has been previously registered with the messaging server 404 (e.g. 300 in FIG. 3). Additionally, messaging server 404 has previously signed a token and transmitted the token to mobile device 402 (e.g. 320 and 330 in FIG. 3).

In embodiments, tag 410 can be a computational tag, a non-computational tag, a computing device, a bar code, an unpowered tag, a powered tag, etc. For the purposes of this example, tag 410 can be an unpowered computational tag.

Additionally, for the purposes of this example, the messaging service provided by the messaging server 404 can be an electronic bulletin board, but other types of messaging services may be implemented using the same or similar methods as described. Additionally, tag 410 is associated with a particular thread of the messaging service, and tag 410 is associated with message read privileges and message write privileges for the thread.

A user desiring to read and/or write to the messaging service thread may be required to be in close proximity to tag 410. For example, the thread may be related to information, reviews, comments, and discussions for a museum. Accordingly, the administrators of the thread may desire that only users that have visited the museum have access to the thread, and may have placed the tag in a prominent location at the museum. Additionally, the thread may, for example, be related to a particular exhibit that is only open for a limited time and may only want the thread open to users that have visited the museum and the exhibit during that limited time window.

The user may position mobile device 402 close enough to tag 410 to activate tag 410 and transmit the signed token via, for example, radio-frequency electronic fields (412). Using the power from the radio-frequency electronic fields, tag 410 can verify the signature of the messaging server, countersign and timestamp the token, and then transmit the countersigned token back to mobile device 402 (414).

Upon receiving the countersigned token, mobile device 402 can transmit the countersigned token to the messaging server 404 via network 400 (416). Messaging server 404 can analyze the countersignature and the timestamp to determine that the user of mobile device 402 should be granted read and write privileges to the thread. If the countersignature could not be verified and/or the timestamp did not fall within the given time window, the messaging server 404 may not grant any privileges to the user of mobile device 402.

Accordingly, the user of mobile device 402 would be able to request messages, read messages, and write messages to the thread using communications with messaging server 404 via network 400 (418).

Figure 5:
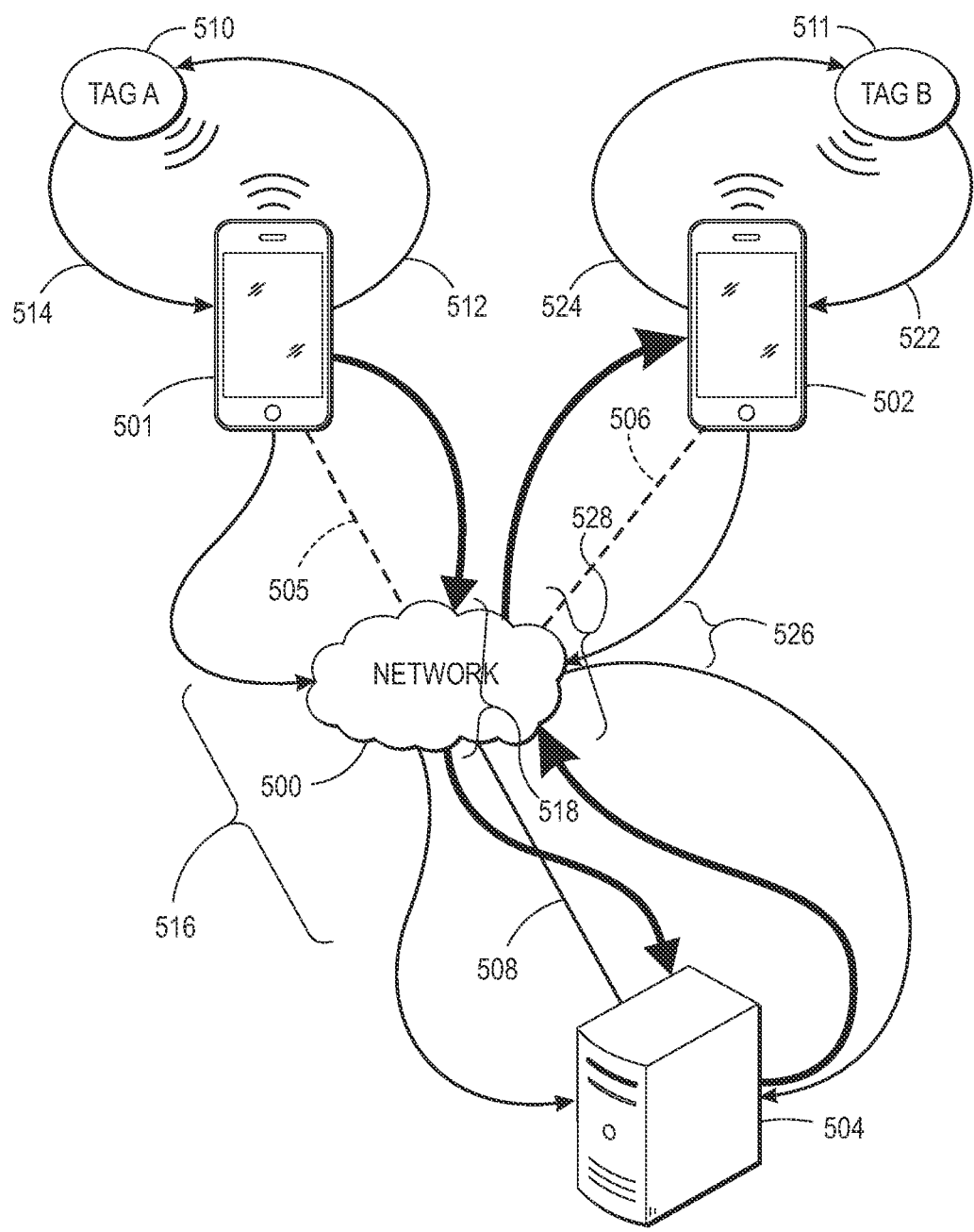
FIG. 5 is a diagram illustrating an exemplary system and process for verifying that devices have physical proximity to tags, consistent with certain disclosed embodiments.

FIG. 5 is a diagram illustrating an exemplary system and process for verifying that devices have physical proximity to tags, consistent with certain disclosed embodiments. As depicted in FIG. 5, mobile devices 501 and 502 can be connected to and communicate with network 500 via, for example, wireless signals 505 and 506.

In embodiments, mobile devices 501 and 502 can represent devices such as cellular phones (e.g. a smartphones), tablet computers, laptops, etc. Further, in some embodiments, network 500 can include one or more networks such as one or more computer networks, one or more cellular networks, a combination of computer networks and cellular networks, etc.

As further depicted in FIG. 5, messaging server 504 can be connected to and communicate with network 500 via, for example, network connection 508. In embodiments, messaging server 504 can include one or more computing devices configured to provide a messaging service.

In the example depicted in FIG. 5, tags 510 and 511 have been previously registered with the messaging server 504 (e.g. 300 in FIG. 3). Additionally, messaging server 504 has previously signed tokens and transmitted the tokens to mobile devices 501 and 502 (e.g. 320 and 330 in FIG. 3).

In embodiments, tags 510 and 511 can be computational tags, non-computational tags, computing devices, bar codes, unpowered tags, powered tags, etc. For the purposes of this example, tags 510 and 511 can be unpowered computational tags.

Additionally, for the purposes of this example, the messaging service provided by the messaging server 504 can be a community website that is intended to be viewed only by members of the community, but other types of messaging services may be implemented using the same or similar methods as described. Additionally, tag 510 is associated with message write privileges and tag 511 is associated with message read privileges for the website.

A user desiring to write to the website may be required to be in close proximity to tag 510. For example, the administrators of the thread may desire that only users that have access to an administrative office for the community have write privileges, and a tag may have been placed at the administrative office for the community. Additionally, the administrators may, for example, configure the messaging service to only allow write access to users that have access to the administrative office during normal business hours.

The user may position mobile device 501 close enough to tag 510 to activate tag 510 and transmit the signed token via, for example, radio-frequency electronic fields (512). Using the power from the radio-frequency electronic fields, tag 510 can verify the signature of the messaging server, countersign and timestamp the token, and then transmit the countersigned token back to mobile device 501 (514).

Upon receiving the countersigned token, mobile device 501 can transmit the countersigned token to the messaging server 504 via network 500 (516). Messaging server 504 can analyze the countersignature and the timestamp to determine that the user of mobile device 501 should be granted write privileges to the website. If the countersignature could not be verified and/or the timestamp did not fall within the given time window, the messaging server 504 may not grant any privileges to the user of mobile device 501.

Accordingly, the user of mobile device 501 would be able to write messages to the community website using communications with messaging server 504 via network 500 (518).

A user desiring to read from the website may be required to be in close proximity to tag 511. For example, the administrators of the thread may desire that only users that have access to a central location in the community have read privileges, and the tag may be placed in a prominent position at the central location.

The user may position mobile device 502 close enough to tag 511 to activate tag 511 and transmit the signed token via, for example, radio-frequency electronic fields (522). Using the power from the radio-frequency electronic fields, tag 511 can verify the signature of the messaging server and countersign the token, and then transmit the countersigned token back to mobile device 502 (524).

Upon receiving the countersigned token, mobile device 502 can transmit the countersigned token to the messaging server 504 via network 500 (526). Messaging server 504 can analyze the countersignature to determine that the user of mobile device 502 should be granted read privileges for the website. If the countersignature could not be verified the messaging server 504 may not grant any privileges to the user of mobile device 502.

Accordingly, the user of mobile device 502 would be able to read messages from the community website using communications with messaging server 504 via network 500 (528).

Figure 6:
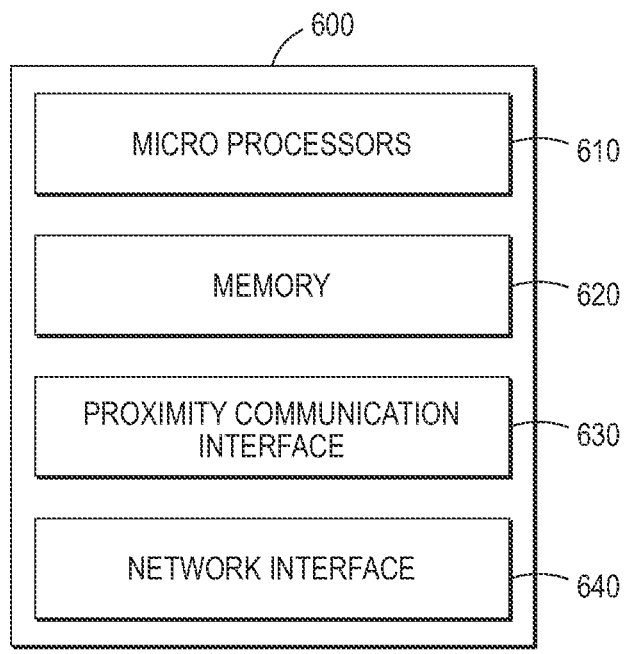
FIG. 6 is a diagram illustrating an exemplary hardware system of a device that can be verified to have proximity to a tag, consistent with certain disclosed embodiments.

FIG. 6 is a diagram illustrating an exemplary hardware system of a device that can be verified to have proximity to a tag, consistent with certain disclosed embodiments. Computing device 600 may represent any type of one or more computing devices, such as mobile device 402 in FIG. 4 and mobile devices 501 and 502 in FIG. 5.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; etc. One or more microprocessors 610, and one or more memory devices or computer-readable media 620 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

Further, computing device 600 can include, for example, proximity communication interface 630 for communication with one or more tags. Proximity communication interface 630 can include hardware and software for utilizing one or more forms of close proximity communication, such as RFID, and may utilize close various proximity communication standards such as Bluetooth® standard and near field communication (NFC) standard. Additionally, computing device 600 can include, for example, network interface 640 for communicating via computer and/or data networks, such as the Internet, cellular networks, etc.

Figure 7:
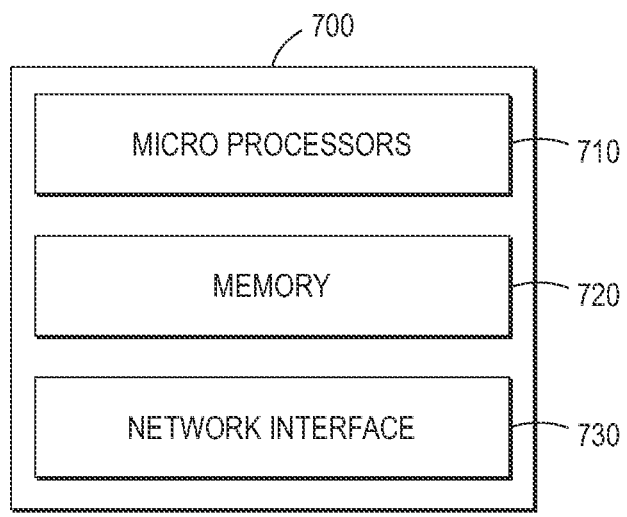
FIG. 7 is a diagram illustrating an exemplary hardware system that can provide a messaging service and verify device proximity to a tag, consistent with certain disclosed embodiments.

FIG. 7 is a diagram illustrating an exemplary hardware system that can provide a messaging service and verify device proximity to a tag, consistent with certain disclosed embodiments. Computing device 700 may represent any type of one or more computing devices, such as messaging service 404 in FIG. 4 and messaging server 504 in FIG. 5.

Computing device 700 may include, for example, one or more microprocessors 710 of varying core configurations and clock frequencies; one or more memory devices or computer-readable media 720 of varying physical dimensions and storage capacities, such as flash drives, hard drives, random access memory, etc., for storing data, such as images, files, and program instructions for execution by one or more microprocessors 710; etc. One or more microprocessors 710, and one or more memory devices or computer-readable media 720 may be part of a single device as disclosed in FIG. 7 or may be contained within multiple devices. Those skilled in the art will appreciate that the above-described componentry is exemplary only, as computing device 700 may comprise any type of hardware componentry, including any necessary accompanying firmware or software, for performing the disclosed embodiments. Further, computing device 700 can include, for example, network interface 730 for communicating via computer and/or data networks, such as the Internet, cellular networks, etc.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method for verifying proximity to a computational tag, the method comprising:
    transmitting, by a mobile device to a server, a request to access a messaging service that requires proximity verification;
    receiving, at the mobile device, a first token from the server in response to the request;
    transmitting, via the mobile device, the first token to the computational tag, whereby the computational tag is powered by the mobile device and wherein:
        the computational tag verifies the first token using power from the mobile device;
        the computational tag generates a second token based on the first token using power from the mobile device; and
        the second token comprises a signature of the computational tag and a timestamp;
    receiving, at the mobile device, the second token from the computational tag; and
    transmitting, via the mobile device, the second token to the server, wherein the server verifies proximity to the computational tag based on a verification of the second token and allows access to the messaging service based on the verification of the second token.

2. The method of claim 1, wherein:
    the first token comprises a signature of the server;
    the computational tag verifies the first token by verifying the signature of the server; and the signature of the computational tag is a countersignature.

3. The method of claim 1, wherein the first token is transmitted to the computational tag using proximity communication.

4. The method of claim 3, wherein the proximity communication comprises at least one of Radio-frequency identification (RFID), a communication using near-field communication (NFC) standard, and a communication using Bluetooth® standard.

5. The method of claim 3, wherein the computational tag is powered using the proximity communication.

6. The method of claim 1, wherein the access to the messaging service comprises at least one of read access and write access.

7. The method of claim 1, wherein the messaging service comprises at least one of email, text messaging, instant messaging, an electronic bulletin board, an internet forum, a websites, a blog, and a newsgroup.

8. The method of claim 1, wherein:
the verification of the second token comprises verifying the signature of the computational tag and verifying that the timestamp is within a specified time window.

9. A method for verifying proximity to a computational tag, the method comprising:
receiving, at a server, a request from a mobile device to access a messaging service that requires proximity verification;
transferring, by the server, a first token to the mobile device in response to the request, wherein:
the mobile device transmits the first token to the computational tag, whereby the computational tag is powered by the mobile device;
the mobile device receives a second token from the computational tag that is based on the first token and comprises a signature of the computational tag and a timestamp; and
the computational tag generates the second token using power from the mobile device;
receiving, at the server, the second token from the mobile device;
verifying, at the server, the second token and verifying proximity to the computational tag based on verifying the second token; and
allowing the mobile device access to the messaging service based on verifying the second token.

10. The method of claim 9, further comprising generating the first token wherein:
the first token comprises a signature; the computational tag verifies the first token by verifying the signature; and the signature of the computational tag is a countersignature.

11. The method of claim 9, wherein the first token is transmitted to the computational tag using proximity communication.

12. The method of claim 11, wherein the proximity communication comprises at least one of Radio-frequency identification (RFID), a communication using near-field communication (NFC) standard, and a communication using Bluetooth® standard.

13. The method of claim 11, wherein the computational tag is powered using the proximity communication.

14. The method of claim 9, wherein the access to the messaging service comprises at least one of read access and write access.

15. The method of claim 9, wherein the messaging service comprises at least one of email, text messaging, instant messaging, an electronic bulletin board, an internet forum, a websites, a blog, and a newsgroup.

16. The method of claim 9, wherein:
verifying the second token comprises verifying the signature of the computational tag and verifying that the timestamp is within a specified time window.

17. A system for verifying proximity to a computational tag, the system comprising:
a processing system comprising one or more microprocessors; and
a memory system comprising one or more computer-readable media, wherein the one or more computer-readable media contain instructions that, when executed by the processing system, cause the processing system to perform operations comprising:
transmitting, by a mobile device to a server, a request to access a messaging service that requires proximity verification;
receiving, at the mobile device, a first token from the server in response to the request;
transmitting, via the mobile device, the first token to the computational tag, whereby the computational tag is powered by the mobile device and wherein:
the computational tag verifies the first token using power from the mobile device;
the computational tag generates a second token based on the first token using power from the mobile device; and
the second token comprises a signature of the computational tag and a timestamp;
receiving, at the mobile device, the second token from the computational tag; and
transmitting the second token to the server, wherein the server verifies proximity to the computational tag based on a verification of the second token and allows access to the messaging service based on the verification of the second token.

18. The system of claim 17, wherein: the first token comprises a signature of the server;
the computational tag verifies the first token by verifying the signature of the server; and
the signature of the computational tag is a countersignature.

19. The system of claim 17, wherein:
the first token is transmitted to the computational tag using proximity communication; and
the computational tag is powered using the proximity communication.

20. The system of claim 17, wherein the access to the messaging service comprises at least one of read access and write access.

* * * * *